United States Patent
Sugano et al.

[11] Patent Number: 6,084,043
[45] Date of Patent: Jul. 4, 2000

[54] CATALYST COMPONENT FOR POLYMERIZATION OF ALPHA-OLEFINS AND PROCESS FOR PRODUCING ALPHA-OLEFIN POLYMERS USING THE SAME

[75] Inventors: Toshihiko Sugano, Yokohama; Hideshi Uchino; Kaori Imaeda, both of Yokkaichi; Eiji Taniyama, Ami-Machi; Naoshi Iwama, Yokohama, all of Japan

[73] Assignee: Mitsubishi Chemical Corporation, Tokyo-To, Japan

[21] Appl. No.: 08/975,277

[22] Filed: Nov. 20, 1997

Related U.S. Application Data

[63] Continuation of application No. 08/514,379, Aug. 11, 1995, abandoned.

[30] Foreign Application Priority Data

Aug. 17, 1994 [JP] Japan .................................... 6-193377

[51] Int. Cl.$^7$ ...................................................... C08F 4/44
[52] U.S. Cl. ..................... 526/127; 526/134; 526/160; 526/943; 502/103; 502/117; 502/152; 556/11; 556/53
[58] Field of Search ................... 556/11, 28, 53; 502/103, 117, 152; 526/160, 943, 134, 127

[56] References Cited

U.S. PATENT DOCUMENTS

| | | | |
|---|---|---|---|
| 2,912,449 | 11/1959 | Sweeney | 556/143 |
| 5,017,714 | 5/1991 | Welborn, Jr. | 556/12 |
| 5,489,659 | 2/1996 | Sugano et al. | 526/127 |
| 5,510,502 | 4/1996 | Sugano et al. | 526/160 |
| 5,561,093 | 10/1996 | Fujita et al. | 502/117 |
| 5,723,640 | 3/1998 | Fukuoka et al. | 526/160 |

FOREIGN PATENT DOCUMENTS

| | | |
|---|---|---|
| 0 485821 | 5/1992 | European Pat. Off. |
| 0 530647 | 3/1993 | European Pat. Off. |
| 0 537686 | 4/1993 | European Pat. Off. |
| 0 611773 | 8/1994 | European Pat. Off. |

OTHER PUBLICATIONS

R L Halterman, Chem. Rev. 1992, 92, 965, 984–986 "Synthesis and application of chiral cyclopentadienylmetal complexes".

*Primary Examiner*—David W. Wu
*Assistant Examiner*—Roberto Rabago
*Attorney, Agent, or Firm*—Oblon, Spivak, McClelland, Maier & Neustadt, P.C.

[57] ABSTRACT

A catalyst component for the polymerization of alpha-olefins, represented by the following formula [I]:

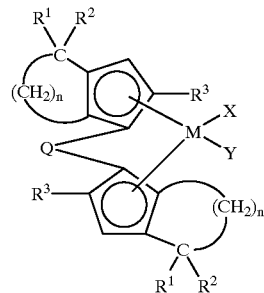

wherein $R^1-R^3$=H, a halogen, a $C_{1-10}$ hydrocarbon radical, a Si-containing $C_{1-18}$ hydrocarbon radical, or a halogen-containing $C_{1-10}$ hydrocarbon radical (provided that $R^1$ and $R^2$ cannot be hydrogen at the same time); n=2 to 7; Q=a $C_{1-20}$ hydrocarbon radical, a silylene or oligosilylene group having or not having a $C_{1-20}$ hydrocarbon radical, a germylene group having or not having a $C_{1-20}$ hydrocarbon radical; X and Y=H, a halogen, a $C_{1-20}$ hydrocarbon radical, or an O- or N-containing $C_{1-20}$ hydrocarbon radical; and M=a transition metal selected from the groups IVB-VIB; a catalyst for the polymerization of alpha-olefins, comprising the catalyst component; and a process for producing alpha-olefin polymers, where use is made of the catalyst. Use of the catalyst will produce alpha-olefin polymers having a high melting point and a high molecular weight in a high yield.

11 Claims, No Drawings

CATALYST COMPONENT FOR POLYMERIZATION OF ALPHA-OLEFINS AND PROCESS FOR PRODUCING ALPHA-OLEFIN POLYMERS USING THE SAME

This application is a Continuation application Ser. No. 08/514,379 on Aug. 11, 1995, abandoned.

BACKGROUND OF THE INVENTION

1. Field of the Invention

The present invention relates to a catalyst component for use in the polymerization of alpha-olefins. More specifically, the present invention relates to a catalyst component for the polymerization of alpha-olefins and a catalyst for the same comprising the catalyst component, which make it possible to produce alpha-olefin polymers having a high melting point, and to a process for producing alpha-olefin polymers using the catalyst.

2. Related Art

The so-called Kaminsky catalysts (metallocene catalysts) are well known as homogeneous catalysts for the polymerization of olefins. These catalysts are characterized in that they have extremely high polymerization activity and that they are useful for the production of polymers having a narrow molecular-weight distribution.

Ethylenebis(indenyl)zirconium dichloride and ethylenebis-(4,5,6,7-tetrahydroindenyl)zirconium dichloride have been known as transition-metal compounds which are used when isotactic polyolefins are produced by the use of the Kaminsky catalysts (Japanese Laid-Open Patent Publication No. 130314/1986). However, these compounds appear to have shortcomings in that the polyolefins obtained have a low molecular weight and that when the polymerization is carried out at low temperatures, high-molecular-weight polyolefins can be obtained, but the compounds cannot show high polymerization activity. Further, it has also been known that polyolefins having a high molecular weight can be obtained when those compounds which are prepared by replacing the zirconium in the above transition-metal compounds with hafnium are used (Journal of Molecular Catalysis, 56 (1989), pp. 237–247). However, this method seems to he disadvantageous in that high polymerization activity would not be expected.

Furthermore, dimethylsilylenebis-substituted cyclopentadienylzirconium dichloride and the like were proposed in Japanese Laid-Open Patent Publication No. 301704/1989, Polymer Preprints, Japan, Vol. 39, No. 6, pp. 1614–1616 (1990) and Japanese Laid-Open Patent Publication No. 12406/1991, and dimethylsilylenebis(indenyl)zirconium dichloride and the like were proposed in Japanese Laid-Open Patent Publications Nos. 295007/1988 and 275609/1989. By these catalysts, it was made possible to obtain highly-stereoregular polymers having a high melting point if the polymerization is carried out at relatively low temperatures. However, when polymerization is carried out under the condition of higher temperatures, which is economically advantageous, the polymers obtained would have a stereoregularity, a melting point and a molecular weight significantly lowered. For this reason, it is demanded to improve the catalysts.

Japanese Laid-Open Patent Publications Nos. 268307/1992 and 268308/1992 suggest that the stereoregularity and molecular weight of polymers can be improved to some extent when use is made as a catalyst of a compound having a substituent attached at a site next to the site of the crosslinking group (the 2-position) in the above-described cyclopentadienyl compound. Further, Japanese Laid-Open Patent Publications Nos. 300887/1992, 306304/1993, 100579/1994, 184179/1994 and 157661/1994 suggest that polymers having improved properties can be obtained when use is made as a catalyst of a metallocene compound having a substituent attached to the indenyl group. However, the properties of those polymers which are produced by the use of these substituted compounds under the polymerization condition of elevated temperatures, which condition is economically advantageous, are seemed to be still insufficient.

An object of the present invention is to provide a catalyst component for the polymerization of alpha-olefins and a catalyst for the same, which make it possible to produce, in high yield, high-molecular-weight olefin polymers capable of being extrusion- or injection-molded, having a high melting point, and a process for producing alpha-olefin polymers.

SUMMARY OF THE INVENTION

The present invention has been accomplished as a result of the studies which were made in order to solve the aforementioned problems in the prior art.

The present invention provides a catalyst component for use in the polymerization of alpha-olefins which comprises a compound represented by the following general formula [I]:

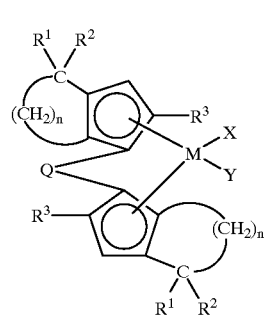

wherein $R^1$, $R^2$ and $R^3$ each independently represent hydrogen, a halogen, a hydrocarbon radical having 1 to 10 carbon atoms, a silicon-containing hydrocarbon radical having 1 to 18 carbon atoms, or a halogen-containing hydrocarbon radical having 1 to 10 carbon atoms, provided that at least one of $R^1$ and $R^2$ is the radical other than hydrogen; n is an integer of 2 to 7; Q is a divalent group which combines the two 5-membered rings, and represents a hydrocarbon radical having 1 to 20 carbon atoms, a silylene or oligosilylene group, a silylene or oligosilylene group containing a hydrocarbon radical having 1 to 20 carbon atoms, a germylene group, or a germylene group containing a hydrocarbon radical having 1 to 20 carbon atoms; X and Y each independently represent hydrogen, a halogen, a hydrocarbon radical having 1 to 20 carbon atoms, or an oxygen- or nitrogen-containing hydrocarbon radical having 1 to 20 carbon atoms; and M represents a transition metal selected from the groups IVB to VIB in the Periodic Table.

Further, the present invention relates to a catalyst for the polymerization of alpha-olefins, comprising the above-defined catalytic component.

Namely, the catalyst for the polymerization of alpha-olefins according to the present invention comprises the following components (A) and (B) in combination:

Component (A) which is the above-defined catalyst component for the polymerization of alpha-olefins; and Component (B) which is (a) an aluminum oxy compound, (b) a Lewis acid, or (c) an ionic compound which can react with the Component (A) to convert the Component (A) into a cation.

Furthermore, the present invention relates to a process for producing alpha-olefin polymers, where use is made of the above-defined catalyst.

Namely, the process for producing alpha-olefin polymers according to the present invention comprises the step of contacting an alpha-olefin into contact with a catalyst comprising the following Components (A) and (B) in combination, thereby polymerizing the alpha-olefin:

Component (A) which is the above-defined catalyst component for the polymerization of alpha-olefins; and Component (B) which is (a) an aluminum oxy compound, (b) a Lewis acid, or (c) an ionic compound which can react with the Component (A) to convert the Component (A) into a cation.

By the use of the catalyst of the present invention, alpha-olefin polymers having a high melting point and a high molecular weight can be produced in high yield.

Although it is not clear why such advantages inherent in the present invention are attained, the following may be considered as the reason for it (however, the present invention is not restricted by the following theory). Namely, in contrast to a conventional metallocene compound having such a ligand as an indenyl group that has a ring formed with conjugate double bonds contiguous to and fused with a 5-membered ring, the compound having the formula [I] of the present invention is such that the substituents on the ring contiguous to and fused with a 5-membered ring, namely, $R^1$ and $R^2$, at the 4-position, namely, the position at which $R^1$ and $R^2$ are bonded, project upward and downward at right angles or a proper angle to the plane on which the condensing ring lies. It is therefore presumed that since these substituents act as steric hindrance groups which regulate the direction of polymer chains to grow and that of the coordination of monomers, the polymer obtained is to have improved stereoregularity, and, as a result, to have a higher melting point.

Further, when the conventional metallocene compound has a ligand whose 5-membered cyclic compound moiety is 4,5,6,7-tetra-hydroindenyl group, which corresponds to the compound represented by the formula [I] in which both $R^1$ and $R^2$ are hydrogen and n is 3, and when such a compound is used as a catalyst component in polymerization which is carried out at a higher temperature, a polymer having a drastically-lowered melting point tends to be obtained. In contrast, in the case of the compound [I] of the present invention, a change in the stereostructure of the compound would be prevented due to the existence of the substituents at the 4-position. Therefore, a polymer having a melting point which is not lowered can be obtained even when the compound is used in polymerization which is carried out at a higher temperature.

We believe that the above-described effects of the present invention would be unexpected from the prior art.

DESCRIPTION OF THE PREFERRED EMBODIMENT OF THE INVENTION

The present invention relates to a catalyst component for polymerization, comprising a compound represented by the formula [I] which will be described later in detail. Further, the present invention relates to a catalyst for the polymerization of alpha-olefins, which comprises a catalyst component for polymerization comprising in combination Component (A), which is a compound represented by the formula [I], and Component (B) which will be described later in detail; and to a process for producing alpha-olefin polymers, comprising the step of contacting an alpha-olefin with this catalyst, thereby polymerizing the alpha-olefin. The terms "comprising" and "comprising in combination" used herein mean that compounds or components which are not mentioned herein can also be used in combination with those which are mentioned as long as they do not impair the advantages inherent in the present invention.

<Component (A)>

The catalyst component (A) of the present invention is a transition-metal compound represented by the following formula [I]:

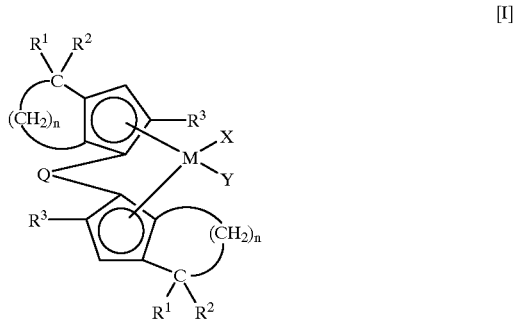

wherein $R^1$, $R^2$ and $R^3$ each independently represent hydrogen, a halogen, a hydrocarbon radical having 1 to 10 carbon atoms, a silicon-containing hydrocarbon radical having 1 to 18 carbon atoms, or a halogen-containing hydrocarbon radical having 1 to 10 carbon atoms, provided that at least one of $R^1$ and $R^2$ is the radical other than hydrogen; n is an integer of 2 to 7; Q is a divalent group which combines the two 5-membered rings, and represents a hydrocarbon radical having 1 to 20 carbon atoms, a silylene or oligosilylene group, a silylene or oligosilylene group containing a hydrocarbon radical having 1 to 20 carbon atoms, a germylene group, or a germylene group containing a hydrocarbon radical having 1 to 20 carbon atoms; X and Y each independently represent hydrogen, a halogen, a hydrocarbon radical having 1 to 20 carbon atoms, or an oxygen- or nitrogen-containing hydrocarbon radical having 1 to 20 carbon atoms; and M represents a transition metal selected from the groups IVB to VIB in the Periodic Table.

The metallocene compound having the formula [I] for use in the present invention is characterized in that the two 5-membered cyclic ligands having the substituents $R^1$, $R^2$ and $R^3$ are, as the formula [I] shows, asymmetric with respect to a plane on which M, X and Y lie in view of the relative position through the group Q, in other words, the two 5-membered cyclic ligands facing each other with a plane on which M, X and Y lie therebetween are not in the relationship between an object and its mirror image with respect to the plane.

$R^1$, $R^2$ and $R^3$ are as mentioned above. More specifically, $R^1$, $R^2$ and $R^3$ each independently represent (a) hydrogen, (b) a halogen, specifically chlorine, bromine, fluorine or the like, (c) a hydrocarbon radical having 1 to 10 carbon atoms, for example, (i) a saturated hydrocarbon radical, specifically, alkyl, cycloalkyl or the like, more specifically, methyl, ethyl, n-propyl, isopropyl, cyclopropyl, n-butyl, isobutyl, sec-butyl, tert-butyl, n-pentyl, cyclopentyl, cyclohexyl, cyclooctyl or the like, or (ii) an unsaturated hydrocarbon radical, specifically, alkenyl, aryl or the like, more specifically, vinyl, allyl, phenyl, tolyl, naphthyl or the like, (d) a silicon-containing hydrocarbon radical having 1 to 18 carbon atoms, for example, an alkylsilyl, arylsilyl, alkylsilylalkyl or arylsilylalkyl group, specifically, dimethylsilyl, trimethylsilyl, triethylsilyl, triphenylsilyl, dimethylsilylmethyl, bis(trimethylsilyl)methyl or the like, or (e) a halogen-containing hydrocarbon radical, for example, a haloalkyl or haloaryl group, specifically, chloromethyl, trichloromethyl, trifluoromethyl, p-fluorophenyl, pentafluorophenyl or the like.

Of these groups enumerated as $R^1$, $R^2$ and $R^3$, an alkyl group having 1 to 4 carbon atoms (for example, methyl, ethyl, n-propyl, i-propyl, cyclopropyl, n-butyl, i-butyl, t-butyl, etc.), an aryl group (for example, phenyl, tolyl, naphthyl, etc.), a silyl group (for example, trimethylsilyl, triphenylsilyl, etc.), and a fluorinated hydrocarbon radical (for example, trifluoromethyl, pentafluorophenyl, etc.) are preferred. An alkyl group having 1 to 4 carbon atoms, and an aryl group having 6 to 10 carbon atoms are more preferred.

As mentioned previously, it is an essential condition that at least either one of $R^1$ and $R^2$ be the radical other than hydrogen, that is, $R^1$ and $R^2$ are not hydrogen at the same time.

n is an integer of 2 to 7, preferably 3 to 7, more preferably 4 to 7. Therefore, the condensing ring formed by $(CH_2)_n$ with two vicinal carbon atoms contained in the 5-membered ring is a 5- to 10-membered ring, preferably a 6- to 10-membered ring. More preferably, n is an integer of 4 to 7, and the condensing ring is a 7-membered ring or larger.

Q is a divalent group which combines the two conjugated 5-membered rings, and represents, for example, (a) a divalent hydrocarbon radical having 1 to 20, preferably 1 to 6 carbon atoms, more specifically, a saturated or unsaturated hydrocarbon radical such as an alkylene, cycloalkylene or arylene group, (b) a silylene or oligosilylene group, (c) a silylene or oligosilylene group containing a hydrocarbon radical having 1 to 20, preferably 1 to 12 carbon atoms, (d) a germylene group, or (e) a germylene group containing a hydrocarbon radical having 1 to 20, preferably 1 to 12 carbon atoms. Of these, alkylene, cycloalkylene, arylene and alkylsilylene groups are preferred. It is preferable that the length of the group Q, namely the distance between the sites of Q, at which the two 5-membered rings are combined, irrespective of the number of carbon atoms contained in Q, be, when Q is linear, equal to the size of approximately 4 atoms or less, in particular, 2 atoms or less, and when Q has a cyclic group, equal to the size of the cyclic group plus approximately 2 atoms or less, in particular, the size of the cyclic group only. Therefore, in the case where Q is an alkylene group, ethylene and isopropylidene where the length of Q is equal to the size of 2 atoms and that of 1 atom, respectively, are preferred; in the case where Q is a cycloalkylene group, cyclohexylene where the length is equal to the size of the cyclohexylene group only is preferred; in the case where Q is an alkylsilylene group, dimethysilylene where the length is equal to the size of 1 atom is preferred; and in the case where Q is an arylsilylene group, diphenylsilylene where the length is again 1 atom is preferred.

X and Y each independently (that is, X and Y may be the same or different) represent (a) hydrogen, (b) a halogen (specifically, fluorine, chlorine, bromine or iodine, preferably chlorine), (c) a hydrocarbon radical having 1 to 20, preferably 1 to 10 carbon atoms, or (d) an oxygen- or nitrogen-containing hydrocarbon radical having 1 to 20, preferably 1 to 10 carbon atoms. Of these, hydrogen, chlorine, methyl, isobutyl, phenyl, benzyl, dimethylamino, diethylamino are preferred.

M is a transition metal selected from the groups IVB to VIB in the Periodic Table, preferably titanium, zirconium or hafnium which is a transition metal selected from the group IVB, more preferably zirconium.

The compound [I] of the present invention can be synthesized by any process as long as it is suitable for introducing the desired substituents or for forming the desired bonding. A typical route for the synthesis of the compound is as follows. It is noted that HRa shown in the synthesis route represents a compound having the following formula:

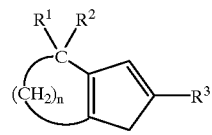

$HR^a + n\text{-}C_4H_9Li \rightarrow R^aLi + n\text{-}C_4H_{10}$
$2R^aLi + QCl_2 \rightarrow Q(R^a)_2 + 2LiCl$
$Q(R^a)_2 + 2\cdot n\text{-}C_4H_9Li \rightarrow Q\ (R^bLi)_2 + 2\cdot n\text{-}C_4H_{10}$
  (wherein $HR^b\ R^a$)
$Q(R^bLi)_2 + ZrCl_4 \rightarrow Q(R^b)_2ZrCl_2 + 2LiCl$ Non-limitative examples of the above transition-metal compound are as follows. Although the following compounds are simply described by their chemical names, it is a matter of course that they are of the asymmetric structure as herein defined in this Specification.

(1) Ethylenebis(4-methyl-4,5,6,7-tetrahydroindenyl)-zirconium dichloride,
(2) Ethylenebis(4,4-dimethyl-4,5,6,7-tetrahydroindenyl)-zirconium dichloride,
(3) Ethylenebis(2,4-dimethyl-4,5,6,7-tetrahydroindenyl)-zirconium dichloride,
(4) Ethylenebis(2,4,4-trimethyl-4,5,6,7-tetrahydro-indenyl) zirconium dichloride,
(5) Ethylenebis(4-methylhexahydroazulenyl)zirconium dichloride,
(6) Ethylenebis(4,4-dimethylhexahydroazulenyl)zirconium dichloride,
(7) Ethylenebis(2,4-dimethylhexahydroazulenyl)zirconium dichloride,
(8) Ethylenebis(2,4,4-trimethylhexahydroazulenyl)-zirconium dichloride,
(9) Ethylenebis(2-methyl-4-phenylhexahydroazulenyl)-zirconium dichloride,
(10) Ethylenebis(2-methyl-4-isopropylhexahydroazulenyl)-zirconium dichloride,
(11) Ethylenebis(9-bicyclo[6.3.0]undeca-2-methyl-2,3,4,5,6,7-hexahydropentaenyl)zirconium dichloride,
(12) Ethylenebis(9-bicyclo[6.3.0]2,10-dimethylundeca-2,3,4,5,6,7-hexahydropentaenyl)zirconium dichloride,
(13) Ethylenebis(9-bicyclo[6.3.0]2,2,10-trimethyl-undeca-2,3,4,5,6,7-hexahydropentaenyl)zirconium dichloride,
(14) Ethylenebis(11-bicyclo[8.3.0]2,12-dimethyltrideca-2,3,4,5,6,7,8,9-octahydrohexaenyl)zirconium dichloride,
(15) Ethylenebis(11-bicyclo[8.3.0]2,2,12-trimethyl-trideca-2,3,4,5,6,7,8,9-octahydrohexaenyl)zirconium dichloride,
(16) Methylenebis(2,4-dimethyl-4,5,6,7-tetrahydro-indenyl) zirconium dichloride,
(17) Methylenebis(2,4,4-trimethyl-4,5,6,7-tetrahydro-indenyl)zirconium dichloride,
(18) Methylenebis(2,4,4-trimethyl-hexahydroazulenyl)-zirconium dichloride,
(19) Isopropylidenebis(2,4-dimethyl-4,5,6,7-tetrahydro-indenyl)zirconium dichloride,
(20) Isopropylidenebis(2,4,4-trimethyl-4,5,6,7-tetrahydroindenyl)zirconium dichloride,

(21) Isopropylidenebis(2,4,4-trimethyl-hexahydro-azulenyl)zirconium dichloride,
(22) Cyclohexylidenebis(2,4-dimethyl-4,5,6,7-tetrahydro-indenyl)zirconium dichloride,
(23) Cyclohexylidenebis(2,4,4-trimethyl-4,5,6,7-tetra-hydroindenyl)zirconium dichloride,
(24) Cyclohexylidenebis(2,4,4-trimethyl-hexahydro-azulenyl)zirconium dichloride,
(25) 1,2-Diphenylethylenebis(2,4-dimethyl-4,5,6,7-tetrahydroindenyl)zirconium dichloride,
(26) 1,2-Diphenylethylenebis(2,4,4-trimethyl-4,5,6,7-tetrahydroindenyl)zirconium dichloride,
(27) 1,2-Diphenylethylenebis(2,4,4-trimethyl-hexa-hydroazulenyl)zirconium dichloride,
(28) Dimethylsilylenebis(4-methyl-4,5,6,7-tetrahydro-indenyl)zirconium dichloride,
(29) Dimethylsilylenebis(4-phenyl-4,5,6,7-tetrahydro-indenyl)zirconium dichloride,
(30) Dimethylsilylenebis(4,4-dimethyl-4,5,6,7-tetrahydroindenyl)zirconium dichloride,
(31) Dimethylsilylenebis(2,4-dimethyl-4,5,6,7-tetrahydro-indenyl)zirconium dichloride,
(32) Dimethylsilylenebis(2,4,4-trimethyl-4,5,6,7-tetra-hydroindenyl)zirconium dichloride,
(33) Dimethylsilylenebis(4-methylhexahydroazulenyl)-zirconium dichloride,
(34) Dimethylsilylenebis(4,4-dimethylhexahydroazulenyl)-zirconium dichloride,
(35) Dimethylsilylenebis(4,4-diphenylhexahydroazulenyl)-zirconium dichloride,
(36) Dimethylsilylenebis(2,4-dimethylhexahydroazulenyl)-zirconium dichloride,
(37) Dimethylsilylenebis(2,4,4-trimethylhexahydro-azulenyl)zirconium dichloride,
(38) Dimethylsilylenebis(2-methyl-4-phenyl-hexahydro-azulenyl)zirconium dichloride,
(39) Dimethylsilylenebis(2-methyl-4-isopropylhexahydro-azulenyl)zirconium dichloride,
(40) Dimethylsilylenebis(2-methyl-4,4-diphenylhexahydro-azulenyl)zirconium dichloride,
(41) Dimethylsilylenebis(9-bicyclo[6.3.0]undeca-2-methyl-2,3,4,5,6,7-hexahydropentaenyl)zirconium dichloride,
(42) Dimethylsilylenebis(9-bicyclo[6.3.0]2,10-dimethyl-undeca-2,3,4,5,6,7-hexahydropentaenyl)zirconium dichloride,
(43) Dimethylsilylenebis(9-bicyclo[6.3.0]2,2,10-trimethylundeca-2,3,4,5,6,7-hexahydropentaenyl)zirconium dichloride,
(44) Dimethylsilylenebis(11-bicyclo[8.3.0]2,12-dimethyl-trideca-2,3,4,5,6,7,8,9-octahydrohexaenyl)zirconium dichloride,
(45) Dimethylsilylenebis(11-bicyclo[8.3.0]2,2,12-trimethyltrideca-2,3,4,5,6,7,8,9-octahydrohexaenyl)zirconium dichloride,
(46) Phenylmethylsilylenebis(2,4-dimethyl-4,5,6,7-tetrahydroindenyl)zirconium dichloride,
(47) Phenylmethylsilylenebis(2,4,4-trimethyl-4,5,6,7-tetrahydroindenyl)zirconium dichloride,
(48) Phenylmethylsilylenebis(2,4,4-trimethylhexahydro-azulenyl)zirconium dichloride,
(49) Diphenylsilylenebis(2,4-dimethyl-4,5,6,7-tetrahydroindenyl)zirconium dichloride,
(50) Diphenylsilylenebis(2,4,4-trimethyl-4,5,6,7-tetrahydroindenyl)zirconium dichloride,
(51) Diphenylsilylenebis(2,4,4-trimethylhexahydro-azulenyl)zirconium dichloride,
(52) Dimethylgermylenebis(2,4-dimethyl-4,5,6,7-tetrahydroindenyl)zirconium dichloride,
(53) Dimethylgermylenebis(2,4,4-trimethyl-4,5,6,7-tetrahydroindenyl)zirconium dichloride, and
(54) Dimethylgermylenebis(2,4,4-trimethylhexahydro-azulenyl)zirconium dichloride.

It is noted that the nomenclature was based on "Nomenclature in Organic Chemistry and Life Chemistry (Book One)" edited by Kenzo Hirayama and Kazuo Hirayama, published by Nankodo, Japan.

Further, those compounds which are obtainable by replacing one of or both of the chlorides in the above-enumerated compounds with bromine, iodine, hydrogen, methyl, phenyl, benzyl, alkoxy, dimethylamide, diethylamide or the like can also be mentioned.

Furthermore, those compounds which are obtainable by replacing the zirconium in the above-enumerated compounds with titanium, hafnium, tantalum, niobium, vanadium, tungsten, molybdenum or the like can also be mentioned. Of these compounds, preferable ones are those in which M is titanium, zirconium or hafnium, which is a transition metal selected from the group IVB, and more preferable ones are those in which M is zirconium.

Of these compounds, those in which one phenyl radical is attached to the 4-position or those in which two hydrocarbon radicals are attached to the 4-position are preferred. Further, tetrahydroindenyl group (n=3), hexahydroazulenyl group (n=4), and octahydro[6.3.0]undeca-pentaenyl group (n=8) are more preferred, hexahydroazulenyl being most preferred.

<Component (B)>

The Component (B) is (a) an aluminumoxy compound, (b) a Lewis acid or (c) an ionic compound which can react wiith the Component (A) to convert the Component (A) into a cation.

Some of the Lewis acids can also be regarded as "an ionic compound which can react with the Component (A) to convert the Component (A) into a cation." Thus, a compound belonging to both of "a Lewis acid" and "an ionic compound which can react with the Component (A) to convert the Component (A) into a cation" should be considered to belong to one of the two.

The aluminumoxy compounds (a) specifically include those represented by the formulae [II], [III] or [IV].

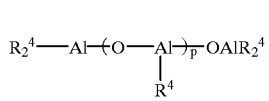
[II]

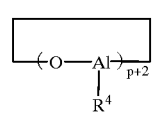
[III]

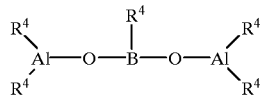
[IV]

wherein p denotes a numeral of 0–40, preferably 2–30, $R^1$s represent hydrogen or a hydrocarbon group having preferably 1–10 carbon atoms, more preferably 1–6 carbon atoms.

The compounds [II] and [III] are also called alumoxanes, which are obtained by the reaction of a trialkylaluminum or two or more types of a trialkylaluminum with water. Specific examples include (i) products obtained from a trialkylaluminum and water such as methylalumoxane, ethylalumoxane, propylalumoxane, butylalumoxane and isobutylalumoxane, and (ii) products obtained from two types of a trialkylaluminum and water such as methylethylalumoxane, methylbutylalumoxane and methylisobutylalumoxane. Among those, the particularly preferred are methylalumoxane and methylisobutylalumoxane.

These alumoxanes can be used in combination thereof within the group (II) or (III) and/or between the groups of (II) and (III). It is also possible to use these alumoxanes in combination with another alkylaluminum compound such as trimethylaluminum, triethylaluminum, triisobutylaluminum or dimethylaluminum chloride.

These alumoxanes can be prepared under a variety of well-known conditions. Specifically, there can be mentioned the following methods:

(i) a method wherein trialkylaluminum is directly reacted with water in the presence of an appropriate organic solvent such as toluene, benzene or ether;

(ii) a method wherein a trialkylaluminum is reacted with a salt hydrate containing water of crystallization such as a hydrate of copper sulfate or aluminum sulfate;

(iii) a method wherein a trialkylaluminum is reacted with moisture supported on silica gel or the like which has been impregnated with water;

(iv) a method wherein trimethylaluminum and another alkylaluminum e.g. triisobutylaluminum in admixture are directly reacted with water in the presence of an appropriate organic solvent such as toluene, benzene or ether;

(v) a method wherein trimethylaluminum and triisobutylaluminum in admixture are reacted under heating with a salt hydrate containing water of crystallization such as a hydrate of copper sulfate or aluminum sulfate;

(vi) a method wherein silica gel is impregnated with water, treated with triisobutylaluminum, followed by additional treatment with trimethylaluminum;

(vii) a method wherein methylalumoxane and isobutylalumoxane are synthesized by known method, these alkylalumoxanes are admixed in a certain amount and then subjected to reaction under heating; and (viii) a method wherein a salt having water of crystallization such as copper sulfate pentahydrate to an aromatic hydrocarbon solvent such as benzene or toluene and the salt is then reacted with trimethylaluminum at a temperature of about −40 to 40° C. In this case, the amount of water used is in a molar ratio of 0.5–1.5 to trimethylaluminum.

Methylalumoxane thus obtained is a linear or cyclic organoaluminum polymer of formula [II] or [III].

The compound [IV] can be obtained by reacting a trialkylaluminum or two or more trialkylaluminums with a alkylboronic acid represented by the formula $$R^5B{-}(OH)_2$$

wherein $R^5$ represents a hydrocarbon group having 1–10 carbon atoms, preferably 1–6 carbon atoms, in a molar ratio of 10:1–1:1. Specific examples of the compound of the formula [IV] include (i) a reaction product of trimethylaluminum and methylboronic acid in a ratio of 2:1, (ii) a reaction product of triisobutylaluminum and methylboronic acid in a ratio of 2:1, (iii) a reaction product of trimethylaluminum, triisobutylaluminum and methylboronic acid in a ratio of 1:1:1, (iv) a reaction product of trimethylaluminum and ethylboronic acid in a ratio of 2:1, and (v) a reaction product of triethylaluminum and butylboronic acid in a ratio of 2:1. The compound [IV] can be used as a mixture thereof, and it can also be used in combination with the another alkylaluminum compound such as trimethylaluminum, triethylaluminum, triisobutylaluminum or dimethylaluminum chloride.

The ionic compound (c) which can react with the Component (A) convert the latter into a cation includes a compound represented by the formula:

$$[K]^{e+}[Z]^{e-} \quad\quad [V]$$

wherein K represents a cationic component having an ionic charge and includes for example a carbonium cation, a tropylium cation, an ammonium cation, an oxonium cation, a sulfonium cation, a phosphonium cation, and the like. There are also mentioned a cation of a metal which tends to be reduced itself or a cation of an organometal. These cations specifically include triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tri(dimethylphenyl) phosphonium, tri(methylphenyl) phosphonium, triphenylsulfonium, triphenyloxonium, triethyloxonium, pyrilium, a silver ion, a gold ion, a platinum ion, a copper ion, a palladium ion, a mercury ion, a ferrocenium ion, and the like.

Z in the formula [V] represents an anionic component having an ionic charge, which will be a counter anion (generally non-coordinated) against a cationic species derived from the Component (A), and includes for example an organoboron compound anion, an organoaluminum compound anion, an organogallium compound anion, an organophosphorus compound anion, an organoarsenic compound anion, an organoantimony compound anion, and the like. The anionic components specifically include (i) tetraphenylboron, tetrakis(3,4,5-trifluorophenyl)boron, tetrakis(3,5-di(trifluoromethyl)phenyl)boron, tetrakis(3,5-di(tert-butyl)phenyl)boron, tetrakis(pentafluorophenyl) boron, (ii) tetraphenylaluminum, tetrakis(3,4,5-trifluorophenyl)aluminum, tetrakis(3,5-di(trifluoromethyl)phenyl)aluminum, tetrakis (3,5-di(tert-butyl)phenyl)aluminum, tetrakis(pentafluorophenyl) aluminum, (iii) tetraphenylgallium, tetrakis(3,4,5-trifluorophenyl) gallium, tetrakis(3,5-di(trifluoromethyl)phenyl)gallium, tetrakis(3,5-di(tert-butyl)phenyl)gallium, tetrakis (pentafluorophenyl)gallium, (iv) tetraphenylphosphorus, tetrakis(pentafluorophenyl)phosphorus, (v) tetraphenylarsenic, tetrakis(pentafluorophenyl)-arsenic, (vi) tetraphenylantimony, tetrakis(pentafluorophenyl) antimony, (vii) a decaborate, an undecaborate, a carbadodecaborate, a decachlorodecaborate, and the like.

As a Lewis acid (b), particularly the one which can convert the Component (A) into a cation, there are illustrated a variety of organoboron compounds, metal halide compounds, and solid acids. Specifically, there can be mentioned (i) an organoboron compound such as triphenylboron, tris(3,5-difluorophenyl)boron and tris(pentafluorophenyl) boron; (ii) a metal halide compound such as aluminum chloride, aluminum bromide, aluminum iodide, magnesium chloride, magnesium bromide, magnesium iodide, magnesium chlorobromide, magnesium chloroiodide, magnesium bromoiodide, magenesium chloride hydride, magnesium chloride hydroxide, magnesium bromide hydroxide, magnesium chloride alkoxides and magnesium bromide alkoxides, (iii) a solid acid such as silica-alumina and alumina.

These ionic compounds and the Lewis acids can be used solely or in combination with the aluminumoxy compounds represented by the formula [II], [III] or [IV]. These compounds can also be used in combination with an organoaluminum compound such as a tri-lower alkylaluminum, a di-lower alkylaluminum monohalide, a mono-lower alkylaluminum dihalide and a lower alkylaluminum sesquihalide as well as a derivative thereof in which a part of these lower alkyl groups has been replaced by a phenoxy group, examples of which include trimethylaluminum, triethylaluminum, triisobutylaluminum, diethylaluminum phenoxide and dimethylaluminum chloride.

<Making up Catalysts>

The catalyst of the present invention can be prepared by bringing the above described Components (A) and (B) into contact in the presence or absence of a monomer to be polymerized in or outside a polymerization vessel.

The Components (A) and (B) may be used in any suitable amounts in the present invention. For instance, in the case of solvent polymerization, the Component (A) is preferably used in an amount of $10^{-7}$–$10^2$ mmole/liter, more preferably $10^{-4}$–1 mmole/liter based on the transition metal atom. In the case where the Component (B) is the aluminumoxy compound, the molar ratio of Al/transition metal is preferably in the range from 10 or more to 100,000 or less, more preferably from 100 or more to 20,000 or less, particularly from 100 or more to 10,000 or less. On the other hand, when the ionic compound or the Lewis acid is used as the Component (B), the ratio of the Component (B)/the Component (A) on the basis of the transition metal is in the range of 0.1–1,000, preferably 0.5–100, more preferably 1–50.

The catalyst of the present invention can, as described above, contain other components or ingredients in addition to the Components (A) and (B). The third component as an optional ingredient which can be incorporated in addition to the Components (A) and (B) include for example an active hydrogen-containing compound such as $H_2O$, methanol, ethanol and butanol, an electron-donating compound such as an ether, an ester or an amine, and an alkoxy containing compound such as phenyl borate, dimethylmethoxyaluminum, phenyl phosphite, tetraethoxysilane and diphenyldimethoxysilane.

When these catalysts are used in the polymerization of an olefin, the Components (A) and (B) may be separately introduced into a reaction vessel, or the Components (A) and (B) which have been previously brought into contact with each other may be introduced into a reaction vessel. When the Components (A) and (B) are previously brought into contact with each other, it is also possible to carry out the contact in the presence of a monomer to be polymerized in order to partially polymerize the monomer, that is to subject the catalyst to preliminary polymerization.

It is also possible to bring the Components (A) and (B) and a porous carrier, for example an inorganic porous carrier such as silica, alumina or magnesium chloride, or an organic porous carrier such as polypropylene, polystyrene or polydivinylbenzene into contact in a desired sequence and to use the mixture as a supported catalyst.

<Use of Catalyst/Polymerization of Olefins>

The catalyst according to the present invention can be applied not only to the solvent polymerization with a solvent, but also to the liquid phase solvent-free polymerization, the vapor phase polymerization or the molten polymerization wherein no solvent is substantially used. In addition, it is applied to the continuous polymerization or the batch-wise polymerization. As the solvent in the solvent polymerization, saturated aliphatic or aromatic hydrocarbons such as hexane, heptane, pentane, cyclohexane, benzene or toluene are used alone or as a mixture thereof.

Polymerization temperature is in the range of from −78 to ca. 200° C., preferably from −20 to 100° C. The pressure of the olefin in the reaction system is not specifically limited, but it is preferably in the range of atmospheric pressure to 50 $kg/cm^{2.}$ G.

During polymerization, it is possible to control the molecular weight by the well-known means such as the selection of temperature or pressure, or the introduction of hydrogen.

α-Olefins to be polymerized with the catalyst of the present invention, that is to say, the α-olefins including ethylene used for the polymerization reaction in the process of the present invention are α-olefins having 2–20 carbon atoms, preferably 2–10 carbon atoms. The α-olefins include specifically propylene, 1-butene, 4-methyl-1-pentene, 1-hexene, 1-octene, 1-decene, 1-dodecene, 1-tetradecene, 1-hexadecene, 1-octadecene, 1-eicocene, and the like. The catalyst of the present invention is preferably used for the polymerization of an α-olefin having 3–10 carbon atoms for the purpose of the stereospecific polymerization, particularly for the polymerization of propylene. These α-olefins can be subjected to polymerization as a mixture thereof.

Furthermore, the catalyst of the present invention can be used for polymerizing the above described higher α-olefin with ethylene, and it can be effectively used also for the copolymerization of the other monomers copolymerizable with the above described α-olefins including conjugated and non-conjugated dienes such as butadiene, 1,4-hexadiene, 7-methyl-1,6-octadiene, 1,8-nonadiene and 1,9-decadiene, and cyclic olefins such as cyclopropene, cyclobutene, cyclopentene, norbornene and dicyclopentadiene.

The present invention is illustrated further specifically with reference to the following non-limitative examples.

EXAMPLE 1

<Synthesis of Dimethylsilylenebis(2,4-dimethyl-hexahydro-azulenyl)-zirconium dichloride>

2-Methylazulene was synthesized in accordance with the method described in Japanese Laid-Open Patent Publication No. 207232/1987. Thus, 19.5 g (0.16 mol) of tropolone and 40 g (0.21 mol) of p-toluenesulfonic acid chloride were reacted with each other in pyridine to obtain 37.1 g of tosylated tropolone. This compound was then reacted with 20 g (0.15 mol) of dimethyl malonate and 9.7 g (0.18 mol) of NaOMe in methanol at room temperature for four hours to obtain 14.4 g of 3-methoxy-carbonyl-2H-cyclohepta(b)furan-2-one (compound (2)). To 12 g of the compound (2) were added 200 ml of acetone and 70 ml of diethylamine, and the mixture was refluxed for 30 hours. Water was added to this mixture, and the resulting mixture was extracted with toluene to obtain 39.2 g of methyl-2-methyl-azulenecarboxylate. To this compound was further added 25 ml of phosphoric acid, and reaction was carried out at a temperature of 85 to 90° C. for one hour. The reaction mixture was subjected to decomposition with water, and the resultant was extracted with benzene. The organic phase was dried to obtain 6.5 g of the desired compound, 2-methylazulene.

A solution (26.7 ml, 1.0 mole/liter) of methyllithium in ether was added dropwise to a solution of the 2-methylazulene (3.44 g, 24 mmol) in THF (50 ml) at 0° C. The mixture was stirred at 0° C. for 10 minutes and at room temperature for 10 minutes, and then cooled to −78° C. To this mixture was added a solution of dichlorodimethylsilane (1.76 ml, 14.5 mol) in THF (5 ml). The mixture was stirred at −78° C. for 30 minutes and at room temperature for 1.5 hours, and then heated at 50° C. for 2 hours. The mixture was treated with water, and subjected to separation using a silica gel column (hexane:methylene chloride=20:1), whereby a colorless and transparent oily compound, bis[1-

(2,4-dimethyl-1,4-dihydroazulenyl)]dimethylsilane (compound (3)) (1.44 g, 32%), was obtained as a mixture of 8 types of diastereomers.

Subsequently, in diethyl ether, 4.74 ml (7.73 mmol) of a solution of n-butyl lithium (1.63 mol/liter) in n-hexane was added dropwise to 1.33 g of the above-synthesized compound (3) at a temperature of −50° C. or lower over a period of 30 minutes. The temperature of the mixture was gradually raised to room temperature, and the mixture was then stirred for one hour. The solvent was distilled off, and the residue was cooled to −70° C. Cold methylene chloride was added to the residue, and zirconium tetrachloride was then introduced to the mixture over a period of 3 minutes. The mixture was maintained at the temperature for one hour. After the temperature of the mixture was raised to room temperature, the mixture was stirred for an additional 10 hours. Subsequently, the solid was separated by filtration, and the filtrate was distilled off. The residue was recrystallized from a mixture of toluene and n-hexane to obtain 1.2 g of a dark green solid. From the results of $^1$HNMR analysis, the solid was identified as dimethyl-silylenebis(2,4-dimethyl-4-hydroazulenyl)zirconium dichloride (compound (4)).

0.25 g (0.47 mmol) of the compound (4) was dissolved in 35 ml of methylene chloride, and the solution was introduced, along with 30 mg of platinum dioxide, into a 0.1-liter autoclave. The mixture was stirred at room temperature under a hydrogen pressure of 40 bar for 4 hours. After hydrogen was purged, the solution phase was separated by filtration, dried, and then dissolved in toluene. n-Pentane was added to the solution. The precipitate was separated by filtration, and dried to obtain 0.11 g of a light-yellow-greenish white solid. It was confirmed by $^1$HNMR analysis that this solid was the desired compound.

<Polymerization of Propylene>

The inside of a 1.5-liter autoclave equipped with a stirring means was thoroughly replaced with propylene. 500 ml of thoroughly dehydrated and deoxygenated toluene was introduced into the autoclave, followed by the introduction of 10 mmol (0.58 g) (on the basis of Al atom) of "MMAO" (modified MAO) manufactured by TOSO-AKZO CORPORATION, and 0.54 mg (1 micromol) of the above-synthesized dimethylsilylenebis(2,4-dimethyl-hexahydro-azulenyl)zirconium dichloride. To this was introduced propylene, and preliminary polymerization was carried out at 20° C. under 1 kg/cm$^2$G for 15 minutes. The temperature of the mixture was then raised to 40° C., and polymerization was carried out under 7 kg/cm$^2$G for 2 hours. After the polymerization was completed, the polymer slurry obtained was filtered to separate the solid produced. The solid was dried to obtain 79.0 g of a polymer. The catalytic activity was 14.6×10$^4$ g-polymer/g-Component (A). The number-average molecular weight (Mn), the distribution of molecular weight (Mw/Mn) and the melting point of the polymer were found to be 6.06×10$^4$, 2.30, and 148.4° C., respectively.

EXAMPLE 2

<Polymerization of Propylene>

Propylene was polymerized under the same conditions as in Example 1 except that the polymerization temperature was changed to 70° C. The results obtained are as shown in Table 1.

EXAMPLE 3

<Polymerization of Propylene>

Propylene was polymerized under the same conditions as in Example 1 except that 1 mmol (0.198 g) (on the basis of Al atom) triisobutylaluminum and 0.80 mg (1 micromol) of N,N-dimethylanilinium tetrakispentafluorophenylborate were used instead of the methylisobutylalumoxane used in Example 1. The results obtained are as shown in Table 1.

EXAMPLE 4

<Synthesis of dimethylsilylenebis(2,4-dimethyl-4,5,6,7-tetra-hydroindenyl)zirconium dichloride>

In a 500-ml glass-made reactor, 4.76 g (33 mmol) of 2,4-dimethylindene was dissolved in 80 ml of tetrahydrofuran, and the solution was cooled to no higher than −50° C. 21 ml of a 1.6 M solution of n-butyl lithium in hexane was slowly added dropwise into the reactor. The mixture was stirred at room temperature for one hour, and then cooled again to −20° C. To this was slowly added dropwise 2.1 g of dimethyldichlorosilane, and the mixture was stirred at room temperature for 12 hours. 50 ml of water was then added to the mixture. The organic phase was separated, and dried to obtain 3.8 g of dimethylbis(2,4-dimethylindenyl)silane.

3.5 g of the above-obtained dimethylbis(2,4-dimethyl-indenyl)silane was dissolved in 70 ml of tetrahydrofuran. To this solution was slowly added dropwise a 1.6 M solution of n-butyl lithium in hexane with cooling. After the mixture was stirred at room temperature for 3 hours, it was slowly added dropwise to a solution of zirconium tetrachloride (2.6 g, 11 mmol) in tetrahydrofuran (60 ml). After the resulting mixture was stirred for 5 hours, hydrogen chloride gas was blown into the mixture, and the mixture was then dried. Subsequently, methylene chloride was added to the mixture, and the soluble matter was separated and crystallized at a low temperature to obtain 0.45 g of an orange powder.

It was confirmed by a $^1$HNMR analysis that the compound obtained was dimethylsilylenebis (2,4-dimethylindenyl)zirconium dichloride (compound (5)) and that the two 2,4-dimethylindenyl groups in the compound were asymmetric.

0.50 g (0.99 mmol) of the compound (5) was dissolved in 35 ml of methylene chloride. The solution was introduced, along with 50 mg of platinum dioxide, into a 0.1-liter autoclave, and reaction was carried out at 70° C. under a hydrogen pressure of 40 bar for 6 hours. After the reaction mixture was cooled to room temperature, hydrogen was purged. The solution phase was separated by filtration, and dried. The residue was dissolved in toluene, and n-pentane was added to the solution. The solid precipitated was separated by filtration, and dried to obtain 0.15 g of a light-greenish white solid. It was confirmed by $^1$HNMR analysis that the solid obtained was the desired compound.

<Polymerization of Propylene>

Propylene was polymerized under the same conditions as in Example 1 except that dimethylsilylenebis(2,4-dimethyl-4,5,6,7-tetrahydroindenyl)zirconium dichloride was used instead of the dimethylsilylenebis(2,4-dimethyl-hexahydroazulenyl)-zirconium dichloride used in Example 1.

As a result, 120.8 g of a polymer was obtained. The catalytic activity was 23.6×10$^4$ g-polymer/g-Component (A). The number-average molecular weight (Mn), the distribution of molecular weight (Mw/Mn) and the melting point of the polymer were found to be 17.3×10$^4$, 2.45, and 148.2° C., respectively.

EXAMPLE 5

<Polymerization of Propylene>

Propylene was polymerized under the same conditions as in Example 4 except that the polymerization temperature was changed to 70° C. The results obtained are as shown in Table 1.

TABLE 1

| | Complex | Component (B) | Component (B) | Polymerization temperature | Catalytic Activity (g/g-Component A)) | Melting Point (° C.) | Number-Average Molecular Weight (Mn) | Mw/Mn (= Q) |
|---|---|---|---|---|---|---|---|---|
| Example 1 | (1) 1 μM | MMAO 10 mM | — | 40° C. | 148,000 | 148.4 | 60,600 | 2.30 |
| Example 2 | (1) 1 μM | ↓ | — | 70° C. | 294,000 | 144.8 | 45,500 | 2.25 |
| Example 3 | (1) 1 μM | triisobutyl-aluminum | dimethylanilinium tetrakispentafluoro-phenylborate 1 μM | 40° C. | 125,500 | 148.8 | 51,800 | 2.35 |
| Example 4 | (2) 1 μM | MMAO 10 mM | — | 40° C. | 236,000 | 148.2 | 173,000 | 2.45 |
| Example 5 | (2) 1 μM | ↓ | — | 70° C. | 432,000 | 146.3 | 131,000 | 2.38 |

(1) Dimethylsilylenebis(2,4-dimethyl-hexahydroazulenyl)zirconium dichloride
(2) Dimethylsilylenebis(2,4-dimethyl-4,5,6,7-tetrahydroindenyl)zirconium dichloride

EXAMPLE 6

Synthesis of Ethylenebis(2,4,4-trimethyl-hexahydroazulenyl)-zirconium dichloride Ethylenebis(2,4,4-trimethyl-hexahydroazulenyl)-zirconium dichloride was synthesized in accordance with the Scheme 1 attached herein below, where the compound is numbered (19). 2,2-Dimethylcycloheptanone (13) was synthesized in accordance with the method described in the pertinent reference set forth in the Scheme 1.

In the syntheses which follow, the numeral in parentheses means the compound indicated by the numeral in the Scheme 1.

Synthesis of Propargylcycloheptanone (14)

A solution of lithium diisopropylamide (LDA) in THF (50 ml) was added to a solution of 2,2-dimethylcycloheptanone (13) (10.55 g, 75.37 mmol) in THF (30 ml) at a temperature of 0° C. The mixture was stirred at room temperature for one hour. To this was added dropwise propargylbromide (6.85 ml, 90.44 mmol) at 0° C. The mixture was stirred at room temperature for one hour, and then heated at 50° C. for 3 hours. The mixture was treated with an aqueous ammonium chloride solution, and then purified by distillation (100° C., 2 mmHg) to obtain propargyl-cycloheptanone (14) (7.34 g, 55%).

$^1$HNMR (300 MHz, CDCl$_3$) δ 1.36 (s, 6H, (CH$_3$)$_2$), 1.1–2.20 (m, 9H), 2.40–2.52 (m, 1H), 2.70–2.84 (m, 1H), 3.30–3.41 (m, 1H); EI-MS m/z 178 (20, M$^+$), 135 (50), 79 (70), 69 (100), 41 (87)

Synthesis of Acetonylcycloheptanone (15)

Mercury oxide (116 mg) was dissolved in water (10 ml). To this solution were added concentrated sulfuric acid (0.5 ml) and methanol (10 ml). To this solution, a solution of the propargylcycloheptanone (14) (7.34 g, 41.23 mmol) in methanol (20 ml) was added little by little, and the mixture was heated at 60° C. for 20 minutes. After the mixture was cooled, sodium chloride was dissolved in the mixture. The solution was extracted with a mixture of hexane and ether to obtain acetonylcycloheptanone (15) (8.26 g, quant.).

$^1$HNMR (300 MHz, CDCl$_3$) δ 1.08 (s, 3H, CH$_3$), 1.16 (s, 3H, CH$_3$), 1.05–1.85 (m, 8H, CH$_2$), 2.12 (s, 3H, CH$_3$CO), 2.29 (dd, $^3$J=18 Hz, $^2$J=4 Hz, 1H), 3.11 (dd, $^3$J=18 Hz, $^3$J=10 Hz, 1H), 3.40–3.41 (m, 1H); $^{13}$CNMR (75 MHz, CDCl$_3$) δ 23.48 (CH$_3$), 24.33, 28.48 (CH$_3$), 29.77, 30.14 (CH$_3$CO), 32.97, 38.70, 43.00 (CH), 46.55 (CHCH$_2$), 47.62((CH$_3$)$_2$C), 207.49 (CO), 218.39 (CO); EI-MS m/z 196 (2, M$^+$), 163 (26), 140 (13), 43 (100, CH$_3$CO$^+$)

Synthesis of Enone (16)

The acetonylcycloheptanone (15) (7.0 g, 35.7 mmol) was added to a solution of sodium hydride (2.8 g, 60% content, 71.4 mmol) in toluene (300 ml), and the solution was refluxed by heating for 2.5 hours. After the solution was cooled, ethanol was added to the solution little by little, and allowed to react with the excessive sodium hydride. Subsequently, the solution was neutralized with dilute hydrochloric acid. The crude product obtained was purified by column chromatography (SiO$_2$, hexane:AcOEt=3:1) to obtain enone (16) (4.1 g, 65%).

$^1$HNMR (300 MHz, CDCl$_3$) δ 0.74 (s, 3H, CH$_3$), 1.00 (s, 3H, CH$_3$), 1.40–1.90 (m, 8H, CH$_2$), 2.25–2.30 (m, 1H), 2.39–2.50 (m, 1H), 2.90–2.99 (m, 1H), 5.95 (brs, 1H, CH═); EI-MS m/z 178 (7, M$^+$), 136 (100), 121 (46), 107 (24)

Synthesis of 2,4,4-Trimethylhexahydroazulene (17)

A solution of methyl lithium (27.64 mmol) in ether was added to a solution of the enone (4.1 g, 23.03 mmol) in THF (40 ml) at 0° C., and the mixture was stirred overnight at room temperature. To this was added an aqueous ammonium chloride solution, and dilute hydrochloric acid was then further added to the mixture to acidify the aqueous layer. By this, dehydration was proceeded, and the crude product, the compound (17), was obtained. The product was purified by column chromatography (SiO$_2$, hexane) to obtain 2,4,4-trimethylhexa-hydroazulene (17) (2.86 g, 71%).

$^1$HNMR (300 MHz, CDCl$_3$) δ 1.38 (s, 3H, (CH$_3$)$_2$), 1.75–1.90 (m, 4H), 1.95–2.10 (m, 2H), 2.23 (s, 3H, CH$_3$C═), 2.60–2.68 (m, 2H), 3.08 (s, 2H, CH$_2$), 6.36 (brs, 1H, CH═); EI-MS m/z 176 (30, M$^+$), 161 (100, M$^+$-Me), 119 (43), 105 (15)

Synthesis of Crosslinked Compound (18)

A solution of dibutyl magnesium (0.85 mmol) in heptane was added to a solution of the 2,4,4-trimethylhexahydroazulene (298 mg, 1.69 mol) in toluene (5 ml) at room temperature. The mixture was stirred at room temperature for one hour and at 100° C. for 2.5 hours, and then cooled to 0° C. To this were added THF (5 ml) and dibromoethane (72 microliter, 0.85 mmol). The mixture was stirred at room temperature for 3 hours and at 50° C. for one hour. The mixture was then treated with an aqueous ammonium chloride solution, and purified by column chromatography to obtain crosslinked compound (18).

Synthesis of Ethylenebis(2,4,4-Trimethylhexahydroazulenyl)-zirconium dichloride (19)

0.12 g of the crosslinked compound (18) was dissolved in diethyl ether. To this solution was added dropwise 0.39 ml (0.63 mmol) of a solution of n-butyl lithium (1.63 mol/liter) in n-hexane at a temperature of no hither than −50° C. The temperature of the mixture was gradually raised to room temperature. The mixture was stirred for one hour, and then cooled again to no higher than −50° C. To this was added 0.12 g of zirconium tetrachloride/diethyl ether complex compound (containing two diethyl ether molecules per zirconium atom). After the addition was completed, the temperature of the mixture was gradually raised to room temperature, and the mixture was stirred for 20 hours.

The reaction mixture was concentrated under reduced pressure, and extracted with toluene. The organic phase was concentrated, and n-hexane was further added thereto. The mixture was cooled, and the solid was separated and dried. The yield was 0.05 g. It was confirmed by a $^1$HNMR analysis that the solid obtained was ethylenebis(2,4,4-trimethylhexahydro-azulenyl)zirconium dichloride (19).

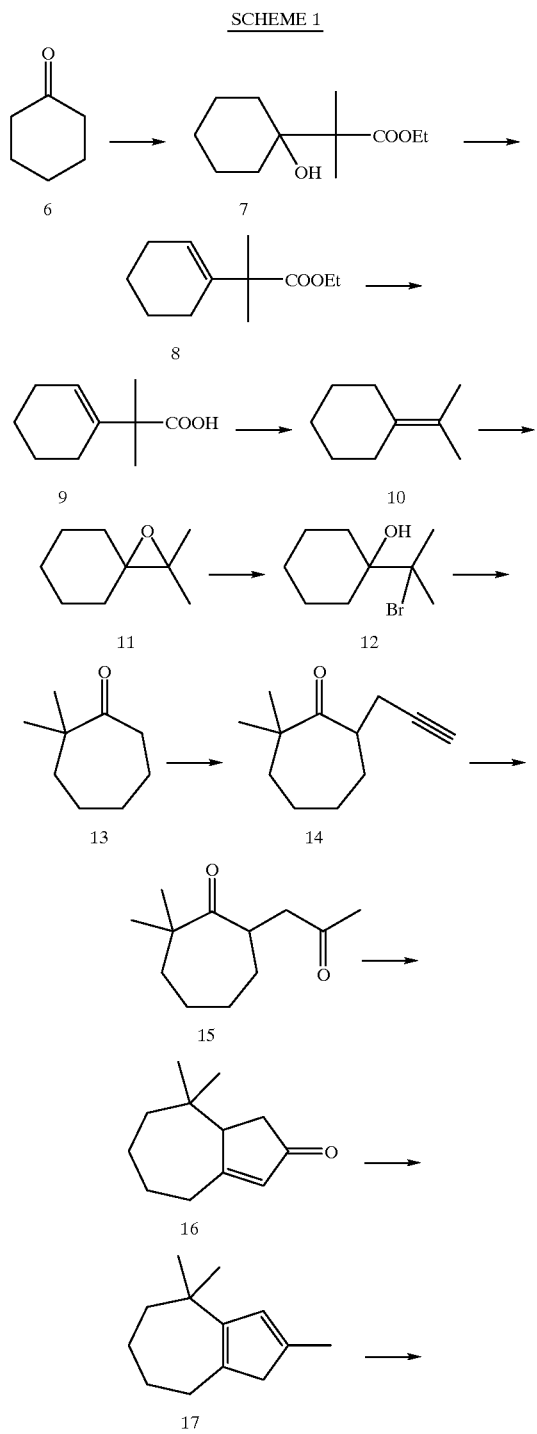

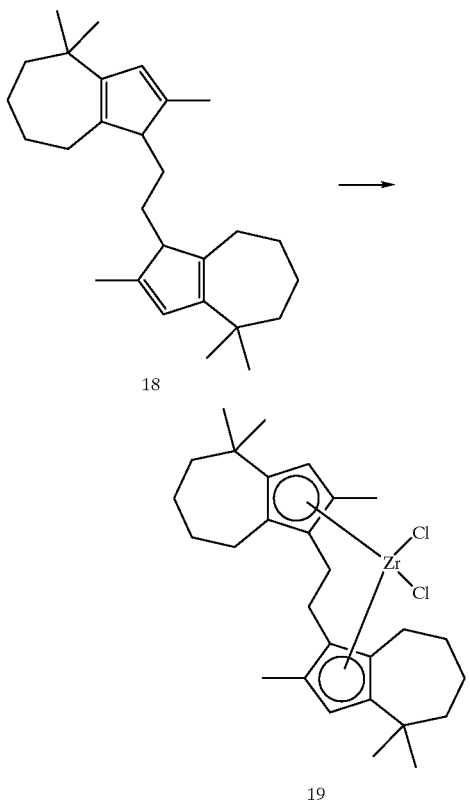

References

6–10: Wallach, O.; Mallison, H.: Justus Liebigs Ann. Chem. 1908, 360, 68.

10–13: Sisui, A. J.; Meyers, M.: J. Org. Chem. 1973, 26, 4431

EXAMPLE 7

Synthesis of Dimethylsilylenebis(2-methyl-3,4,5,6,7,8-hexahydro-4-phenylazulenyl)zirconium dichloride>

Synthesis of dimethylbis[1-(2-methyl-4-phenyl-1,4-dihydroazulenyl)]silane (2)

The syntheses followed Scheme 2 appended hereto, and the compounds numbered herein are those indicated in Scheme 2.

2-Methylazulene (1) (2.22 g, 15.66 mmol) was dissolved in hexane (30 mL), to which was added a solution of phenyllithium in cyclohexane-ether (15.6 mL, 1.0 mole/liter) gradually at 0° C. The solution was stirred for 1 hour at room temperature, followed by cooling to −78° C. and then addition of tetrahydrofuran (30 mL). To this was added dimethyldichlorosilane (0.95 mL, 7.83 mmol) and the mass was warmed to room temperature and then heated to 50–60° C. for 1.5 hrs. Aqueous ammonium chloride was then added, and the organic layer formed was separated, dried over magnesium sulfate, and the solvent was then evaporated in vacuo. The crude product obtained gave, upon purification by silica gel chromatography, dimethylbis[1-(2-methyl-4-phenyl-1,4-dihydroazulenyl)]silane (1.48 g, 38%).

$^1$HNMR (300 MHz, CDCl$_3$) δ 0.63–0.00 (m, 6H, Si(CH$_3$)$_2$), 2.0–2.1 (m, 6H, CH$_3$), 3.55–3.93 (m, 4H), 5.45–5.87 (m, 4H), 6.05–6.30 (m, 4H), 6.55–6.80 (m, 2H), 7.15–7.55 (m, 10H).

Synthesis of dimethylsilylenebis(2-methyl-4-hydro-4-phenylazulenyl)zirconium dichloride (3)

All of the following procedures were carried out under the nitrogen atmosphere, and the solvents used were the ones which had been thoroughly desiccated and deoxygenated.

To a solution of the thus synthesized compound (2) (0.768 g, 1.55 mmol) dissolved in diethylether (15 ml) was added at −76° C. dropwise a 1.98 ml of a solution of n-butyllithium in hexane, and the solution was raised gradually to room temperature at which a reaction took place for 12 hours. The solvent was then distilled off in vacuo, the product remained was washed with hexane and the hexane was again distilled off. To the product obtained was added 20 ml of a mixture of toluene/diethylether of 40/1, followed by addition at −60° C. of zirconium tetrachloride (0.325 g, 1.40 mmol). The admixture formed was warmed gradually to room temperature at which a reaction took place for 15 hours. After the reaction, the product was filtered, the solid product obtained was extracted with toluene, and the extract was concentrated. To the extract concentrated was added hexane to form a precipitate, which was then recrystallized to give a brownish yellow solid product (0.15 g). The solid product was formed, upon ¹HNMR analysis, to be a 50/50 mixture of the racemic product and the meso product of dimethylsilylenebis(2-methyl-4-hydro-4-phenylazulenyl)-zirconium dichloride (3).

The product (3) obtained (70 mg, 0.11 mmol) dissolved in 10 ml of methylene chloride was added to a 0.1-liter autoclave and platinum oxide (10 mg, 0.04 mmol) in methylene chloride (10 ml) was also added. The autoclave was agitated for 5 hours under a hydrogen pressure of 40 kg/cm², and the product was then filtered to give dimethylsilylenebis (2-methyl-3,4,5,6,7,8-hexahydro-4-phenylazulenyl) zirconium dichloride (4) as an orange yellow solid (20 mg).

SCHEME 2

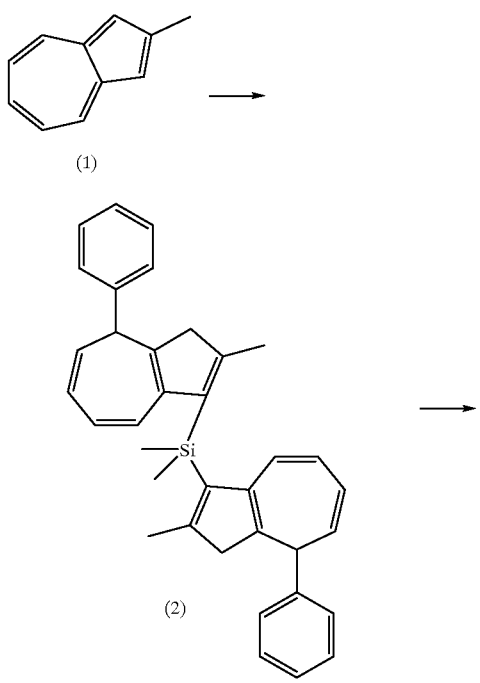

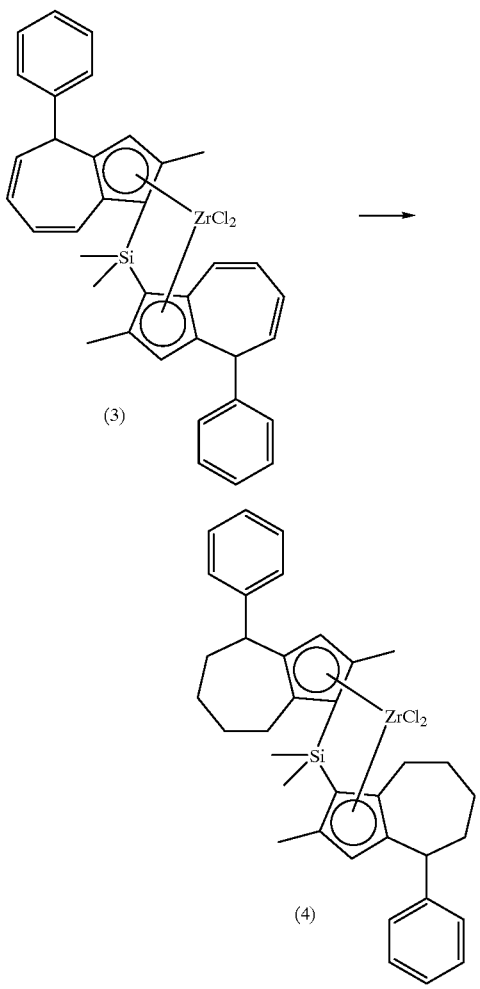

EXAMPLE 8
<Polymerization of propylene>

After a 1.5-liter autoclave equipped with a stirring means had been thoroughly purged with propylene, toluene (500 ml) which had been desiccated and deoxygenated thoroughly was introduced, followed by "PMAO" (methylalumoxane, manufactured by Toso-Akzo Japan, polymerization degree: 16) in an amount of 1.5 mmole (0.087 g) based on Al atom.

The autoclave was warmed to 40° C., and dimethylsilylenebis(2-methyl-3,4,5,6,7,8-hexahydro-4-phenylazulenyl)zirconium dichloride (4) (0.100 mg, 0.15 pmol) was introduced followed by addition of 100 ml of hydrogen. Polymerization took place upon introduction of propylene at a pressure of 7 kg/cm²G for 1.5 hours. The polymer slurry thus formed was filtered, and the polymer was obtained upon drying in an amount of 37.0 g.

The catalyst activity was 185,000 g of polymer/g of complexehour, and the polymer thus obtained a number average molecular weight (Mn) of 3.24×104, a molecular weight distribution (Mw/Mn) of 3.34 and a melting point of 158.9° C.

EXAMPLE 9
<Polymerization of propylene>

Propylene was polymerized in the same manner as in Example 8 except that polymerization was carried out at a temperature of 70° C.

The catalyst activity was 211,000 g of polymer/g of the complex.hour, and the polymer thus obtained had a number average molecular weight (Mn) of $3.96 \times 10^4$, a molecular weight distribution (Mw/Mn) of 4.37, and a melting point of 157.1° C.

EXAMPLE 10

<Polymerization of propylene>

Propylene was polymerized in the same manner as in Example 9 except that polymerization was carried out in the absence of hydrogen added.

The catalyst activity was 82,000 g of polymer/g of the complexohour, and the polymer thus obtained had a number average molecular weight (Mn) of $19.6 \times 10^4$, a molecular weight distribution (Mw/Mn) of 2.98, and a melting point of 154.9° C.

What is claimed is:

1. A catalyst component for the polymerization of alpha-olefins, comprising a compound represented by the following general formula:

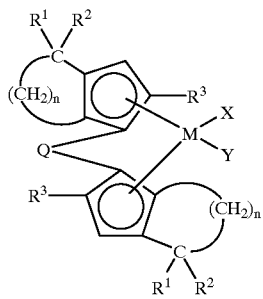

[I]

wherein $R^1$, $R^2$ and $R^3$ each independently represent hydrogen, a halogen, a hydrocarbon radical having 1 to 10 carbon atoms, or a halogen-containing hydrocarbon radical having 1 to 10 carbon atoms, provided that $R^1$ is an aryl radical of 6 to 10 carbon atoms;

n is an integer of 4 to 7;

Q is a divalent group which combines the two 5-membered rings, and represents a hydrocarbon radical having 1 to 20 carbon atoms, a silylene or oligosilylene group, a silylene or oligosilylene group containing a hydrocarbon radical having 1 to 20 carbon atoms, a germylene group, or a germylene group containing a hydrocarbon radical having 1 to 20 carbon atoms;

X and Y each independently represent hydrogen, a halogen, a hydrocarbon radical having 1 to 20 carbon atoms, or an oxygen- or nitrogen-containing hydrocarbon radical having 1 to 20 carbon atoms; and M represents a tetravalent transition metal selected from the group IVB in the Periodic Table.

2. The catalyst component for use in the polymerization of alpha-olefins according to claim 1, wherein is a hydrocarbon radical having 1 to 10 carbon atoms.

3. The catalyst component for the polymerization of alpha-olefins according to claim 1, wherein when Q is linear, the number of atoms in the chain linking the sites to which the 5-membered rings are bonded is 4 or less.

4. The catalyst component for the polymerization of alpha-olefins according to claim 3, wherein the number of atoms in the chain linking the sites to which the 5-membered rings are bonded is 2 or less.

5. The catalyst component for the polymerization of alpha-olefins according to claim 1, wherein when Q has a cyclic group, the number of atoms in the chain linking the sites to which the 5-membered rings are bonded is the cyclic group plus approximately 2 or less.

6. The catalyst component for the polymerization of alpha-olefins according to claim 5, wherein Q is a cycloalkylene group.

7. The catalyst component for use in the polymerization of alpha-olefins according to claim 1, wherein Q is selected from the group consisting of ethylene, isopropylidene, cyclohexylene, dimethylsilylene and diphenylsilylene.

8. A catalyst for the polymerization of alpha-olefins, comprising the following Components (A) and (B) in combination:

Component (A) which is the catalytic component for the polymerization of alpha-olefins according to claim 1; and Component (B) which is (a) an aluminum oxy compound, (b) a Lewis acid, or (c) an ionic compound which can react with the Component (A) to convert the Component (A) into a cation.

9. The catalyst for the polymerization of alpha-olefins according to claim 8, wherein the aluminum oxy compound (a) is a compound represented by the following formula [II], [III] or [IV]:

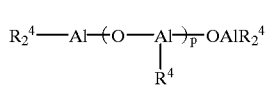

[II]

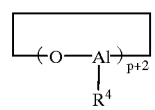

[III]

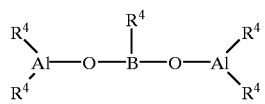

[IV]

wherein p is a number of 0 to 40, and $R^4$ represents hydrogen or a hydrocarbon radical.

10. The catalyst for the polymerization of alpha-olefins according to claim 8, wherein the ionic compound (c) which can react with the Component (A) to convert the Component (A) into a cation is a compound represented by the formula [V]:

$[K]^{e+}[Z]^{e-}$      [V]

wherein K represents a cationic component having an ionic charge and is selected from the group consisting of a carbonium cation, a tropylium cation, an ammonium cation, an oxonium cation, a sulfonium cation, a phosphonium cation, a cation of a metal which tends to be reduced itself and cation of an organometal, Z represents an anionic component having an ionic charge, which will be a counter anion aginst a cationic species derived from the Component (A), and is selected from the group consisting of an organoboron compound anion, an organoaluminum compound anion, an organogallium compound anion, an organophosphorus compound anion, an organoarsenic compound anion, and an organoantimony compound anion.

11. A process for producing alpha-olefin polymers, comprising the step of contactiinng an alpha-olefin with the catalyst according to claim 8, comprising the Components (A) and (B) in combination, thereby polymerizing the alpha-olefin.

* * * * *